United States Patent
Choi et al.

(10) Patent No.: US 10,109,850 B2
(45) Date of Patent: Oct. 23, 2018

(54) ELECTRODE ACTIVE MATERIAL, PREPARATION METHOD THEREOF, AND ELECTRODE AND LITHIUM BATTERY CONTAINING THE SAME

(75) Inventors: Won-chang Choi, Yongin-si (KR); Gue-sung Kim, Yongin-si (KR); Min-sang Song, Seongnam-si (KR); Young-min Choi, Suwon-si (KR); Ryoung-hee Kim, Yongin-si (KR); So-yeon Kim, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 1032 days.

(21) Appl. No.: 13/555,409

(22) Filed: Jul. 23, 2012

(65) Prior Publication Data

US 2013/0115513 A1    May 9, 2013

(30) Foreign Application Priority Data

Nov. 7, 2011    (KR) ........................ 10-2011-0115365

(51) Int. Cl.

| | |
|---|---|
| *H01M 4/36* | (2006.01) |
| *H01M 4/52* | (2010.01) |
| *H01M 4/56* | (2006.01) |
| *H01M 4/50* | (2010.01) |
| *H01M 4/42* | (2006.01) |
| *H01M 4/44* | (2006.01) |
| *H01M 4/58* | (2010.01) |
| *H01M 4/48* | (2010.01) |
| *H01M 4/60* | (2006.01) |
| *H01M 4/04* | (2006.01) |
| *H01M 4/46* | (2006.01) |
| *H01M 4/38* | (2006.01) |
| *H01M 4/485* | (2010.01) |
| *H01M 4/505* | (2010.01) |
| *H01M 4/525* | (2010.01) |
| *H01M 10/0525* | (2010.01) |

(52) U.S. Cl.
CPC ......... *H01M 4/366* (2013.01); *H01M 4/0416* (2013.01); *H01M 4/0471* (2013.01); *H01M 4/483* (2013.01); *H01M 4/485* (2013.01); *H01M 4/505* (2013.01); *H01M 4/525* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| | | |
|---|---|---|
| 2011/0017946 A1 | 1/2011 | Choi |
| 2012/0135303 A1 | 5/2012 | Hong et al. |
| 2012/0282521 A1 | 11/2012 | Choi et al. |

FOREIGN PATENT DOCUMENTS

| | | |
|---|---|---|
| CN | 1834022 | 9/2006 |
| DE | 19922522 A1 | 11/2000 |
| JP | 09073913 * | 3/1997 |
| JP | 11185758 A | 7/1999 |
| JP | 2000149948 A | 5/2000 |
| JP | 2003-272631 A | 9/2003 |
| KR | 1020020024520 A | 3/2002 |
| KR | 1020030032718 A | 4/2003 |
| KR | 1020080010169 A | 1/2008 |
| KR | 10-0888685 | 3/2009 |
| KR | 10-2011-0011497 | 2/2011 |
| KR | 10-2012-0124779 | 11/2012 |
| WO | 03049218 A1 | 6/2003 |
| WO | 2011031544 A2 | 3/2011 |

OTHER PUBLICATIONS

Li, et al., "Enhanced Cycling Performance of Spinel LiMn$_2$O$_4$ Coated with ZnMn$_2$O$_4$ Shell," J Solid State Electrochem (2008) 12: 851-855.
Chinese Office Action dated Sep. 25, 2015 in Corresponding Chinese Patent Application No. 201210266060.9.
Extended European Search Report for European Patent Application No. 12177795.7-2119 dated Dec. 7, 2012.
Fey, G.T.-K. et al., "MgAl2O4 spinel-coated LiCoO2 as long-cycling cathode materials", Journal of Power Sources, 146 (2005) pp. 245-249.
Chinese Office Action dated May 3, 2016.
European Office Action dated Sep. 6, 2016.
Chinese Office Action dated Oct. 10, 2016.
Decision of Rejection issued by the Chinese Patent Office dated Mar. 24, 2017 in the examination of the Chinese Patent Application No. 201210266060.9.
Korean Determination Certificate mailed Apr. 17, 2018.

\* cited by examiner

*Primary Examiner* — Ladan Mohaddes
(74) *Attorney, Agent, or Firm* — Lee & Morse, P.C.

(57) ABSTRACT

An electrode active material includes a core capable of intercalating and deintercalating lithium; and a surface treatment layer disposed on at least a portion of a surface of the core, wherein the surface treatment layer includes a lithium-free oxide having a spinel structure, and an intensity of an X-ray diffraction peak corresponding to impurity phase of the lithium-free oxide, when measured using Cu—Kα radiation, is at a noise level of an X-ray diffraction spectrum or less.

10 Claims, 5 Drawing Sheets

ELECTRODE ACTIVE MATERIAL, PREPARATION METHOD THEREOF, AND ELECTRODE AND LITHIUM BATTERY CONTAINING THE SAME

CROSS-REFERENCE TO RELATED APPLICATIONS

This application claims priority to and the benefit of Korean Patent Application No. 10-2011-0115365, filed on Nov. 7, 2011, and all the benefits accruing therefrom under 35 U.S.C. § 119, the content of which is incorporated herein in its entirety by reference.

BACKGROUND

1. Field

The present disclosure relates to an electrode active material, a preparation method thereof, and an electrode and a lithium battery including the same.

2. Description of the Related Art

For smaller and higher performance devices, it is important to increase the energy density of a lithium battery, in addition to decreasing the size and weight thereof. That is, a higher-voltage and higher-capacity lithium battery would be desirable.

To provide a lithium battery satisfying these desires, research is being conducted on cathode active materials having high voltage and high capacity.

When typical cathode active materials having high voltage and high capacity are used, side reactions, such as elution of a transition metal and generation of gas, occur at a high temperature and/or a voltage higher than about 4.4 V. Due to these side reactions, the performance of a battery is degraded in a high temperature and high voltage environment.

Therefore, there remains a need for improved methods of preventing degradation of a battery in a high temperature and high voltage environment.

SUMMARY

Provided is an electrode active material capable of substantially or effectively preventing performance degradation of a battery under high temperature and high voltage conditions.

Provided is an electrode including the electrode active material.

Provided is a lithium battery including the electrode.

Provided are methods of manufacturing the electrode active material.

Additional aspects, features, and advantages will be set forth in part in the description which follows and, in part, will be apparent from the description.

According to an aspect, an electrode active material includes a core capable of intercalating and deintercalating lithium; and a surface treatment layer disposed on at least a portion of a surface of the core, wherein the surface treatment layer may include a lithium-free oxide having a spinel structure, and an intensity of an X-ray diffraction peak corresponding to an impurity phase of the lithium-free oxide, when measured using Cu—Kα radiation, is at a noise level of an X-ray diffraction spectrum or less.

According to another aspect, an electrode includes the electrode active material.

According to another aspect, a lithium battery includes the electrode.

According to another aspect, a method of manufacturing an electrode active material includes contacting a core including an electrode active material and a lithium-free oxide having a spinel structure; and forming a surface treatment layer including the lithium-free oxide on the core by a dry process to manufacture the electrode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" means a metal of Groups 3 to 12 of the Periodic Table of the Elements.

"Rare earth" means the fifteen lanthanide elements, i.e., atomic numbers 57 to 71, plus scandium and yttrium.

Hereinafter, an electrode active material, a manufacturing method thereof, and an electrode and a battery including the same, according to an exemplary embodiment, will be disclosed in further detail.

An electrode active material according to an embodiment includes a core capable of intercalating and deintercalating lithium; and a surface treatment layer disposed (e.g., formed) on at least a portion of the core, wherein the surface treatment layer includes a lithium-free oxide having a spinel structure, and an intensity of an X-ray diffraction (XRD) peak corresponding to an impurity phase of the lithium-free oxide, when measured using Cu—Kα radiation, is at a noise level of an XRD spectrum or less. The fact that intensities of diffraction peaks of the impurity phases in the XRD spectrum are at the noise level or less indicates that practically no peaks for the impurity phases are detected since the intensities of the diffraction peaks are less than the noise level which forms a baseline. The noise level refers to x-ray scattering that occurs due to scattering in the surrounding environment such as in air, water, etc. irrelevant from the scattering obtained from a target material. The noise level may be determined as the average peak intensity of peaks not corresponding to the core or the surface treatment layer.

That is, because at least a portion of a surface of the core capable of intercalating and deintercalating lithium is treated with spinel-structured lithium-free oxide practically having no impurity phases, the surface treatment layer may be formed on at least a portion of or on an entirety of the surface of the core. The term "surface treatment layer" may also refer to a coating layer as will be understood by a person of ordinary skill in the art. The impurity phase refers to any phase except the spinel phase of the surface treatment layer or a compound of the core.

Since the lithium-free oxide having a spinel structure practically has no impurity phases, a side reaction due to impurity phases during a charge/discharge process may be suppressed.

Hereinafter, unless stated otherwise, a lithium-free oxide having a spinel structure is an oxide in which impurity phases are substantially not present and/or removed and in which lithium is not substantially present, e.g., contained in an amount of less than 1 wt %, specifically less than 0.1 wt %.

The lithium-free oxide having a spinel structure may be highly crystalline. That is, the lithium-free oxide having a spinel structure has a spinel structure, as may be determined in the XRD spectrum using Cu—Kα radiation, and may have a sharper diffraction peak compared to that of a less crystalline lithium-free oxide. As the lithium-free oxide has a high crystalline property, stability of an electrode active material at high voltage may be increased.

For example, the lithium-free oxide has a diffraction peak at about $35.5°\pm2.0°$ two-theta ($2\theta$) for a peak corresponding to a (311) crystal face, when measured using Cu—Kα radiation, and a full width at half maximum (FWHM) of the diffraction peak may be less than $0.3°$ $2\theta$. For example, the lithium-free oxide may have a diffraction peak at about $35.5°\pm2.0°$ $2\theta$ for the peak corresponding to the (311) face, when measured using Cu—Kα radiation, and a FWHM of the diffraction peak may range from about $0.220°$ to about $0.270°$ $2\theta$.

The spinel-structured lithium-free oxide does not substantially intercalate and deintercalate lithium, and thus, does not directly contribute to a battery capacity. Therefore, the surface treatment layer including the oxide may serve, for example, as a protective layer of the core. That is, the surface treatment layer may serve to suppress a side reaction between the core and an electrolyte. The surface treatment layer may also serve to substantially or effectively prevent a transition metal from being removed from the core, which is capable of intercalating and deintercalating lithium.

Any high crystalline spinel-structured oxide having no impurity phases and including two or more metals, except for lithium, or metalloid elements may be used as the spinel-structured lithium-free oxide. The metalloid can be one or more selected from B, Si, Ge, As, Sb, and Te.

The spinel-structured lithium-free oxide has a stronger metal-oxygen bond in comparison to an oxide having a halite crystal structure, for example, NaCl, CaO, and FeO, or an oxide having a corundum crystal structure, for example, $Al_2O_3$, $Fe_2O_3$, $FeTiO_3$, and MgO. Therefore, a stable surface treatment layer may be formed which is stable under high temperature and high voltage conditions.

For example, the lithium-free oxide may be one or more selected from oxides expressed by the following Formula 1:

$$AM^a{}_2O_4, \qquad \text{Formula 1}$$

wherein A is one or more selected from tin (Sn), magnesium (Mg), molybdenum (Mo), copper (Cu), zinc (Zn), titanium (Ti), nickel (Ni), calcium (Ca), iron (Fe), vanadium (V), lead (Pb), cobalt (Co), germanium (Ge), cadmium (Cd), mercury (Hg), strontium (Sr), manganese (Mn), aluminum (Al), tungsten (W), and beryllium (Be), $M^a$ is one or more selected from Mg, Zn, Al, V, Mn, gallium (Ga), chromium (Cr), Fe, rhodium (Rh), Ni, indium (In), Co, and Mn, and A is different from $M^a$.

For example, the lithium-free oxide may be one or more selected from $SnMg_2O_4$, $SnZn_2O_4$, $MgAl_2O_4$, $MoAl_2O_4$, $CuAl_2O_4$, $ZnAl_2O_4$, $ZnV_2O_4$, $TiMn_2O_4$, $ZnMn_2O_4$, $NiAl_2O_4$, $MgGa_2O_4$, $ZnGa_2O_4$, $CaGa_2O_4$, $TiMg_2O_4$, $VMg_2O_4$, $MgV_2O_4$, $FeV_2O_4$, $ZnV_2O_4$, $MgCr_2O_4$, $MnCr_2O_4$, $FeCr_2O_4$, $CoCr_2O_4$, $NiCr_2O_4$, $CuCr_2O_4$, $ZnCr_2O_4$, $CdCr_2O_4$, $TiMn_2O_4$, $ZnMn_2O_4$, $MgFe_2O_4$, $TiFe_2O_4$, $MnFe_2O_4$, $CoFe_2O_4$, $NiFe_2O_4$, $CuFe_2O_4$, $ZnFe_2O_4$, $CdFe_2O_4$, $AlFe_2O_4$, $PbFe_2O_4$, $MgCo_2O_4$, $TiCo_2O_4$, $ZnCo_2O_4$, $SnCo_2O_4$, $FeNi_2O_4$, $GeNi_2O_4$, $MgRh_2O_4$, $ZnRh_2O_4$, $TiZn_2O_4$, $SrAl_2O_4$, $CrAl_2O_4$, $MoAl_2O_4$, $FeAl_2O_4$, $CoAl_2O_4$, $MgGa_2O_4$, $ZnGa_2O_4$, $MgIn_2O_4$, $CaIn_2O_4$, $FeIn_2O_4$, $CoIn_2O_4$, $NiIn_2O_4$, $CdIn_2O_4$, and $HgIn_2O_4$.

For example, the lithium-free oxide may be one or more selected from $SnMg_2O_4$, $SnZn_2O_4$, $MgAl_2O_4$, $CuAl_2O_4$, $ZnAl_2O_4$, and $NiAl_2O_4$.

For example, the lithium-free oxide may be one or more selected from $SnMg_2O_4$, $SnZn_2O_4$, and $MgAl_2O_4$.

The lithium-free oxide may have a ratio of an intensity of an X-ray diffraction peak corresponding to a (440) crystal face to an intensity of an X-ray diffraction peak corresponding to a (311) crystal face, i.e., I(440)/I(311), of about 0.3 or more, specifically about 0.3 to about 5, more specifically about 0.5 to about 3, in an XRD spectrum of the lithium-free oxide. For example, the I(440)/I(311) may range from about 0.3 to about 0.7.

Also, in an XRD spectrum of the lithium-free oxide, a ratio of an intensity of an X-ray diffraction peak corresponding to a (511) crystal face to an intensity of an X-ray diffraction peak corresponding to a (311) crystal face, i.e., I(511)/I(311), may be about 0.25 or more, specifically about 0.3 to about 5, more specifically about 0.5 to about 3. For example, the I(511)/I(311) may range from about 0.25 to about 0.5.

Also, in an XRD spectrum of the lithium-free oxide, a ratio of an intensity of a peak corresponding to a (511) crystal face to an intensity of a peak corresponding to a (440) crystal face, i.e., I(511)/I(440), may be about 0.5 or more, specifically about 0.6 to about 5, more specifically about 0.5 to about 3. For example, the I(511)/I(440) may range from about 0.5 to about 0.9.

The content of the lithium-free oxide may be about 10 weight percent (wt %) or less, for example, about 5 wt % or less, specifically about 0.1 wt % to about 10 wt %, based on the total weight of the electrode active material. For example, the content of the lithium-free oxide may be 0 to about 10 wt %. For example, the content of the lithium-free oxide may be 0 to about 5 wt %.

The surface treatment layer of the electrode active material may include one or more, and in an embodiment two or more, elements selected from a metal and metalloid with an atomic weight of 9 or more, and the surface treatment layer may comprise one or more selected from Sn, Mg, Mo, Cu, Zn, Ti, Ni, Ca, Al, V, Mn, Ga, Fe, Cr, Rh, In, Pb, Co, Ge, Cd, Hg, Sr, W, and Be.

A content of the metal and/or the metalloid with an atomic weight of 9 or more of the surface treatment layer may be about 10 wt % or less, for example, may be 0 to about 10 wt %, specifically about 0.1 wt % to about 8 wt %, based on the total weight of the electrode active material. For example, the metal and/or the metalloid may be contained in an amount of 0 to about 6 wt %.

A composition ratio of oxygen to the metal and/or metalloid of the surface treatment layer, which may be selected from a metal and a metalloid with an atomic weight of 9 or more, may be about 4:2.1 to about 4:3.9. For example, the composition ratio of oxygen to the metal or metalloid may be about 4:2.5 to about 4:3.5. For example, the composition ratio of oxygen to the metal or metalloid may be about 4:2.9 to about 4:3.1. For example, the composition ratio of oxygen to the metal or metalloid may be about 4:3. The composition ratio corresponds to a composition ratio of oxygen to (A+$M^a$) in the lithium-free oxide included in the surface treatment layer and having a composition of the formula $AM^a{}_2O_4$.

A thickness of the surface treatment layer of the electrode active material may range from about 1 angstrom (Å) to about 1 micrometer (μm). For example, the thickness of the surface treatment layer may range from about 1 nanometer (nm) to about 100 nm. For example, the thickness of the surface treatment layer may range from about 1 nm to about 30 nm.

The surface treatment layer on the electrode active material may be formed by completely covering the core or by partially being formed on the core, e.g., to form an island, for example.

An average particle diameter of the core of the electrode active material may be about 10 nm to about 50 μm. For example, the average particle diameter of the core may be about 10 nm to about 30 μm. For example, the average particle diameter of the core may be about 1 μm to about 30 μm.

The core is capable of intercalating and deintercalating lithium in the electrode active material and may include a cathode active material. The cathode active material may be lithium transition metal oxide. Any lithium transition metal oxide for a cathode of a lithium battery which is used in the art may be used as the lithium transition metal oxide. For example, the lithium transition metal oxide may have a spinel structure or a layered structure.

The lithium transition metal oxide may be a single composition, or a compound or a composite of two or more compounds. For example, the lithium transition metal oxide may be a composite of two or more compounds, each having a layered-structure. For example, the lithium transition metal oxide may be a composite of a compound having a layered-structure and a compound having a spinel-structure.

For example, the lithium transition metal oxide may include an over-lithiated oxide (OLO) or a lithium transition metal oxide with an average operating voltage about 4.3 V or higher. For example, an average operating voltage of the lithium transition metal oxide may range from about 4.3 V to about 5.0 V.

The average operating voltage means a value obtained by dividing a charge/discharge electric energy by a charge/discharge quantity of electricity when a battery is charged and discharged to an upper limit and a lower limit of a charge/discharge voltage at a selected operating voltage of the battery.

The core may include, for example, a compound expressed by the following Formulas 2 and 4:

$$Li[Li_aMe_{(1-a)}]O_{(2+d)}, \text{ and} \qquad \text{Formula 2}$$

$$Li[Li_bMe_cM'_e]O_{(2+d)} \qquad \text{Formula 3}$$

wherein $0<a<1$, $(b+c+e)=1$; $0<b<1$, $0<e<0.1$; $0\le d\le 0.1$, Me is one or more metals selected from Ti, V, Cr, Mn, Fe, Co, Ni, Cu, Al, Mg, Zr, and B, and M' is one or more metals selected from Mo, W, Ir, Ni, and Mg. For example, $0<a<0.33$.

Also, the core may include compounds expressed by the following Formulas 4 to 8:

$$Li_xCo_{(1-y)}M_yO_{(2-\alpha)}X_\alpha, \qquad \text{Formula 4}$$

$$Li_xCo_{(1-y-z)}Ni_yM_zO_{(2-\alpha)}X_\alpha, \qquad \text{Formula 5}$$

$$Li_xMn_{(2-y)}M_yO_{(4-\alpha)}X_\alpha, \qquad \text{Formula 6}$$

$$Li_xCo_{(2-y)}M_yO_{4-\alpha}X_\alpha, \text{ and} \qquad \text{Formula 7}$$

$$Li_xMe_yM_zPO_{(4-\alpha)}X_\alpha, \qquad \text{Formula 8}$$

wherein $0.90 \le x \le 1.1$, $0 \le y \le 0.9$, $0 \le z \le 0.5$, $(1-y-z)>0$, $0 \le \alpha \le 2$, Me is one or more metals selected from Ti, V, Cr, Mn, Fe, Co, Ni, Cu, Al, Mg, Zr, and B, M is at least one element selected from Mg, Ca, Sr, Ba, Ti, Zr, Nb, Mo, W, Zn, Al, Si, Ni, Mn, Cr, Fe, Mg, Sr, V, and a rare-earth element, and X is an element selected from O, F, S, and P.

Also, the core may include compounds expressed by the following Formulas 9 and 10:

$$(Li_2MO_3)_p\text{---}(LiMeO_2)_{(1-p)}, \text{ and} \qquad \text{Formula 9}$$

$$(Li_2MO_3)_x\text{---}(LiMeO_2)_y\text{---}(Li_{1+d}M'_{2-d}O_4)_z \qquad \text{Formula 10}$$

wherein $0<p<1$, $x+y+z=1$; $0<x<1$, $0<y<1$, $0<z<1$; $0 \le d \le 0.33$, M is one or more metals selected from Mg, Ca, Sr, Ba, Ti, Zr, Nb, Mo, W, Zn, Al, Si, Ni, Mn, Cr, Fe, Mg, Sr, V, and a rare-earth element, Me is one or more metals selected from Ti, V, Cr, Mn, Fe, Co, Ni, Cu, Al, Mg, Zr, and B, and M' is one or more metals selected from Ti, V, Cr, Mn, Fe, Co, Ni, Cu, Al, Mg, Zr, and B.

A compound of Formula 9 may have a layered-structure, the $Li_2MO_3$ and the $LiMeO_2$ of Formula 10 may have a layered-structure, and the $Li_{1+d}M'_{2-d}O_4$ of Formula 10 may have a spinel-structure.

The core capable of charging and discharging lithium in the electrode active material may include anode active material. The anode active material may include one or more selected from lithium metal, a metal which is alloyable with lithium, a transition metal oxide, a non-transition metal oxide, and a carbonaceous material. Any anode active material for a lithium battery which is used in the art may be used as the anode active material.

For example, the metal, which is alloyable with lithium, may comprise one or more selected from Si, Sn, Al, Ge, Pb, Bi, Sb, a Si—Y alloy wherein Y is one or more selected from an alkali metal, an alkali earth metal, a Group 13 element, a Group 14 element, a transition metal, and a rare-earth metal, (other than Si), and an Sn—Y alloy wherein Y is one or more selected from an alkali metal, alkali earth metal, a Group 13 element, a Group 14 element, a transition metal, and a rare-earth metal (other than Sn). The element Y may comprise one or more selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

For example, the transition metal oxide may comprise one or more selected from lithium titanium oxide, vanadium oxide, and lithium vanadium oxide.

For example, the non-transition metal oxide may comprise one or more selected from $SnO_2$ or $SiO_x$ ($0<x<2$).

The carbonaceous material may comprise one or more selected from crystalline carbon, and an amorphous carbon. The crystalline carbon may comprise one or more selected from natural graphite of amorphous type, plate type, flake type, spherical type, or fiber type, and synthetic graphite. The amorphous carbon may comprise one or more selected from soft carbon (low-temperature-sintered carbon), hard carbon, mesophase pitch carbide, and sintered coke.

The surface treatment layer of the electrode active material may be formed on a surface of a core by mechanically applying energy with a dry process after contacting (e.g., mixing) a precursor of the spinel-structured lithium-free oxide and the core.

An electrode according to an embodiment may include the electrode active material described above. The electrode may be a cathode or an anode.

The cathode may be manufactured as follows.

A cathode active material composition may be prepared by contacting (e.g., mixing) a cathode active material having a surface treatment layer formed on at least a portion of a surface thereof, a conducting agent, a binder, and a solvent. The cathode active material composition may be directly coated on an aluminum current collector and dried for manufacturing a cathode plate on which a cathode active layer is formed. Alternatively, the cathode active material composition may be cast on a separate support, and then a film peeled from the support is laminated on an aluminum current collector for manufacturing a cathode plate on which a cathode active layer is formed.

As the conducting agent, carbon black, natural graphite, artificial graphite, acetylene black, ketjen black, carbon fiber; a metal powder, metal fiber, or metal tube such as carbon nanotube, copper, nickel, aluminum, and silver; and a conductive polymer such as polyphenylene derivatives may be used; however, the conducting agent is not limited thereto, and any conducting agent used in the art may be used.

As the binder, vinylidene fluoride/hexafluoropropylene co-polymer, polyvinylidene fluoride (PVDF), polyacrylonitrile, poly(methyl methacrylate), polytetrafluoroethylene (PTFE), mixture of the foregoing polymers, and styrene butadiene rubber polymer may be used, and as the solvent, N-methylpyrrolidone (NMP), acetone, and water may be used; however, the solvent is not limited thereto, and any material used in the art may be used. Contents of the cathode active material, the conducting agent, the binder, and the solvent may be selected so as to be suitable for use in a lithium battery.

The anode may be manufactured using the same method as that used for the cathode except that an anode active material instead of a cathode active material is used.

For example, the anode may be manufactured as follows.

An anode active material composition may be manufactured by contacting (e.g., mixing) an anode active material having a surface treatment layer formed on at least a portion of a surface thereof, a conducting agent, a binder, and a solvent. The anode active material composition may be directly coated on a copper current collector for manufacturing an anode plate. Alternatively, the anode active material composition may be cast on a separate support, and then an anode active material film peeled from the support is laminated on a copper current collector to manufacture an anode plate.

The same conducting agent, binder, and solvent as in the cathode may be used for the anode active material. If desired, a plasticizer may be added to the cathode active material composition and the anode active material composition to form pores in an electrode plate.

Contents of the anode active material, the conducting agent, the binder, and the solvent may be selected to be suitable for use in a lithium battery. According to use and structure of a lithium battery, one or more of the conducting agent, the binder, and the solvent may be omitted if desired.

A lithium battery according to an embodiment may comprise the electrode. The lithium battery, for example, may be manufactured as follows.

First, a cathode and an anode according to an embodiment are manufactured as described above. One or more of the cathode and anode include an electrode active material of which a surface treatment layer including a lithium-free oxide having a spinel structure and having no impurity phases is formed on a core capable of intercalating and deintercalating lithium.

Next, a separator to be inserted between the cathode and the anode is provided. Any separator typically used for a lithium battery may be used. A separator which has low resistance to ion movement and has an excellent ability in containing an electrolyte solution may be used. For example, the separator may comprise at least one selected from glass fiber, polyester, Teflon, polyethylene, polypropylene, and PTFE, wherein the selected separator may be a non-woven fiber type or a woven fiber type separator. For example, a windable separator such as polyethylene and polypropylene may be used for a lithium-ion battery, and a separator having an excellent ability in containing an organic electrolyte solution may be used for a lithium-ion polymer battery. For example, the separator may be manufactured as follows.

A separator composition may be prepared by mixing a polymer resin, a filler, and a solvent. The separator composition may be directly coated on an electrode and dried for forming the separator. Or, the separator composition may be cast on a support and dried, and then a separator film peeled from the support may be laminated on an electrode for forming the separator.

The polymer resin used for manufacturing the separator is not particularly limited, and thus, any material used as a bonding material of an electrode plate may be used. For example, vinylidene fluoride/hexafluoropropylene co-polymer, PVDF, polyacrylonitrile, poly(methyl methacrylate), or a combination thereof may be used.

Next, an electrolyte is prepared.

For example, the electrolyte may be an organic electrolyte solution. The electrolyte may also be a solid. For example, the electrolyte may be a boron oxide or lithium oxynitride; however, it is not limited thereto, and any solid electrolyte used in the art may be used. The solid electrolyte may be formed on the anode using a sputtering method.

For example, an organic electrolyte solution may be prepared. The organic electrolyte solution may be manufactured by dissolving lithium salt in an organic solvent.

Any organic solvent used in the art may be used for the organic solvent. For example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a combination thereof may be used.

Any lithium salt used in the art may be used for the lithium salt. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a combination thereof may be used.

Figure 6:
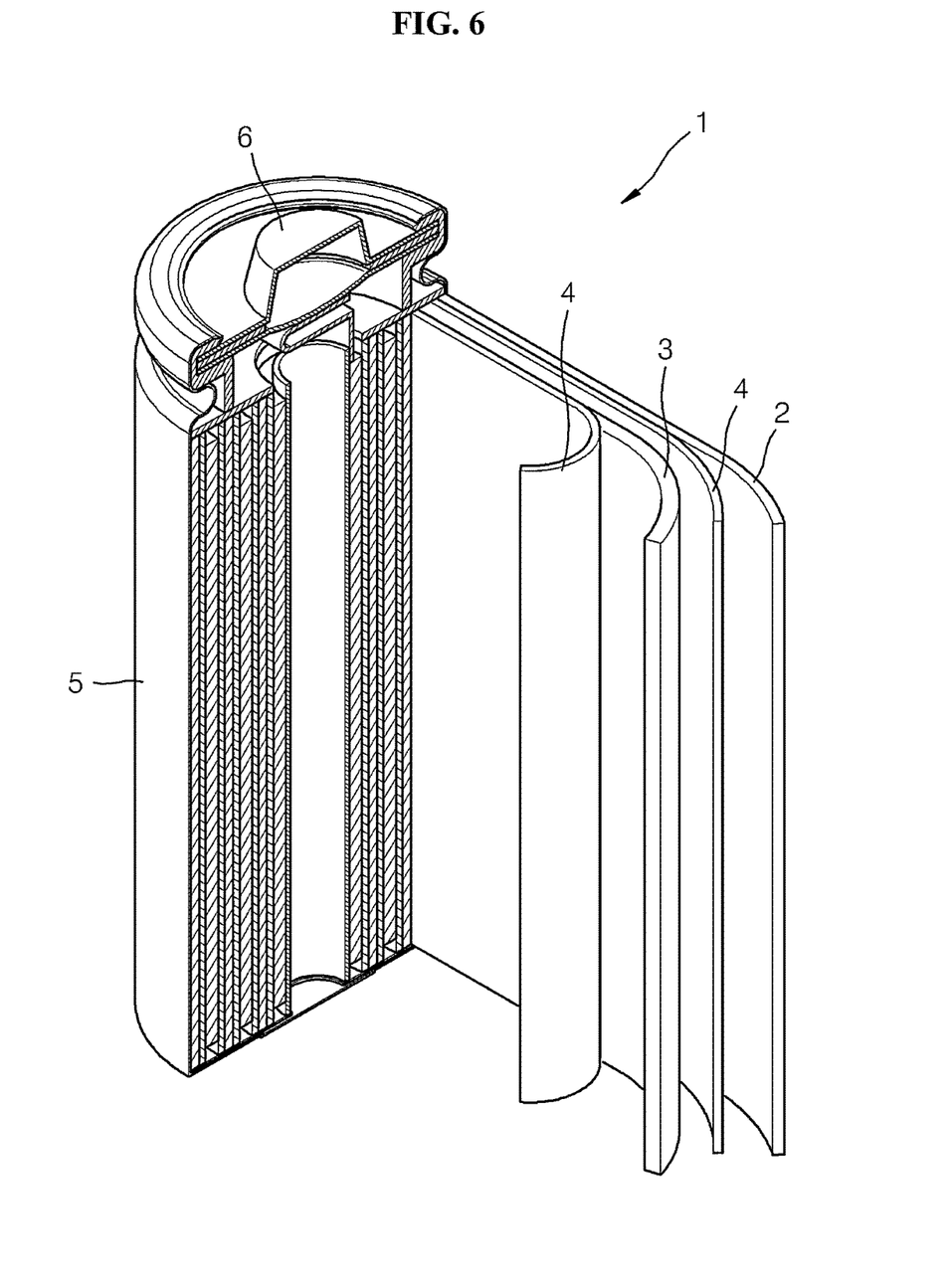
FIG. 6 is a schematic diagram illustrating a lithium battery according to an embodiment.

As illustrated in FIG. 6, a lithium battery 1 includes a cathode 3, an anode 2, and a separator 4. The above-described cathode 3, anode 2, and separator 4, as described above, are wound or folded to be encased in a battery case 5. Thereafter, an organic electrolyte solution is injected into the battery case 5 and sealed by a cap assembly 6 for completing the lithium battery 1. The battery case 5 may have a cylindrical shape, a square shape, or a thin film shape. For example, the battery 1 may be a large thin film type battery. The battery 1 may be a lithium-ion battery.

The separator 4 may be disposed between the cathode 3 and the anode 2 to form a battery structure. The battery structure may be layered as a bicell structure and impregnated in an organic electrolyte solution, and then an obtained structure is accommodated in a pouch and is sealed to complete a lithium-ion polymer battery.

Also, a plurality of the battery structures may be layered for forming a battery pack, and the battery pack may be used for any high-capacity and high-output devices. For example, the battery pack may be used for a notebook computer, a smartphone, or an electric vehicle.

Also, since the lithium battery has excellent storage stability, life characteristics, and high rate characteristics under high temperature conditions, the lithium battery may be used in an electric vehicle (EV). For example, the lithium battery may be used in a hybrid vehicle such as a plug-in hybrid electric vehicle (PHEV).

A method of manufacturing an electrode active material according to another embodiment includes mixing a core including the electrode active material and a lithium-free oxide particle having a spinel structure; and forming a surface treatment layer including the lithium-free oxide on the core by undergoing a dry process.

The dry process includes forming a surface treatment layer, without using a solvent, by inducing mechanical energy to a mixture of a core including the electrode active material and a lithium-free oxide particle.

The dry process may comprise a) a method of disposing, e.g., contacting and attaching, a powder of a covering material, for example a spinel-structured lithium-free oxide, on a surface of a core with a low speed ball mill and simultaneously cohering the attached particles each other to form a surface treatment layer, b) a method of confining and attaching covering material particles on a surface of a core particle by rotation of a grinding media or a rotator disposed in an apparatus, and simultaneously binding the covering material particles mechanically on the core particle by stresses or binding the particles by softening or fusing a surface treatment layer of the covering material particles on the core particle by a heat produced by the stresses, or c) a method of fusing a portion or the entire surface treatment layer and the core by performing a heat treatment on the core covered with the surface treatment layer formed according to the method a) and/or b) and then cooling, but the method is not limited thereto, and any dry process used in the art may be used.

For example, the dry process may be one selected from a planetary ball mill method, a low-speed ball mill method, a high-speed ball mill method, a hybridization method, and a mechanofusion method. For example, a mechanofusion method may be used. In the mechanofusion method, the mixture is fed into a rotating container, where the mixture is subjected to a centrifugal force and is fixed on the container inner wall, and then the mixture is compressed in a gap between the container inner wall and an arm head near the container inner wall. A mechanofusion method corresponds to the method b).

Performing a heat treatment on a product in which the surface treatment layer is formed may be further included after forming the surface treatment layer with the dry process. Due to the heat treatment, the surface treatment layer may be firmer and/or more stable than before the heat treatment. A heat treatment condition that may fuse a portion or the entire surface treatment layer may be available.

In the method above, the content of the lithium-free oxide may be about 10 wt % or less, based on the total weight of both the core and the lithium-free oxide. For example, the content of the lithium-free oxide may be about 5 wt % or less, based on the total weight of both the core and the lithium-free oxide. For example, the content of the lithium-free oxide may be 0 to about 10 wt %. For example, the content of the lithium-free oxide may be 0 to about 5 wt %.

The method of manufacturing the lithium-free oxide particles may include preparing a mixture by milling a lithium-free oxide precursor; and sintering the mixture to prepare a lithium-free oxide having a spinel-structure.

In the step of preparing a mixture by milling a lithium-free oxide precursor, intermediate phase may be prepared by pre-reacting precursor particles through a treatment of the lithium-free oxide precursor with the ball mill or the like. The intermediate phase may be a phase including an oxide including two or more transition metals.

Since the mixture includes the intermediate phase, a formation of various secondary phase, for example, a formation of impurity phases due to ZnO volatilization during the sintering process, may be prevented. That is, due to the middle phase formation, a lithium-free oxide having a spinel structure from which impurity phases are removed may be manufactured even at high temperature during the sintering process. Also, due to the high temperature sintering, the crystalline properties of the lithium-free oxide may be improved.

After the manufacturing of the lithium-free oxide having a spinel structure, grinding of the lithium-free oxide may be further performed. Due to the grinding, lithium-free oxide nanoparticles may be prepared. The nanoparticles may have a diameter of about 10 nm to about 1000 nm, specifically about 20 nm to about 900 nm, more specifically about 30 nm to about 800 nm.

The sintering of the mixture may be performed at a high temperature of about 700° C. to about 1500° C. For example, the sintering may be performed at a temperature of about 1000° C. to about 1400° C.

As the sintering of the mixture is performed at a high temperature, properties of a surface treatment material may be conveniently controlled. For example, since control of the sintering temperature is convenient, content of impurities or the like may be readily adjusted. In contrast, when the mixture is heat treated at the same time with the core, the sintering temperature is limited to be a low temperature of lower than 700° C. to prevent deterioration of the core, so it is difficult to control properties of a surface treatment material.

According to the foregoing method, the sintering may be performed for about 12 to about 72 hours. For example, the sintering may be performed for about 24 to about 60 hours. For example, the sintering may be performed for about 36 to about 60 hours.

The sintering may be performed in an oxygen, air, or nitrogen atmosphere. For example, the sintering may be performed in an air atmosphere.

Hereinafter, the present disclosure will be described in further detail through examples and comparative examples. The examples and comparative examples are just for exemplification of the present disclosure, and the present disclosure shall not limited thereto.

Manufacture of Spine-Structured Lithium-Free Oxide

Preparation Example 1 (Dry Process)

Tin oxide (SnO) and zinc oxide (ZnO) were mixed at a mole ratio of about 1:2 and milled at about 300 to about 500 revolutions per minute (rpm) for about 5 hours in a planetary ball mill (Fritsch, Planetary mono mill 6). Subsequently, $SnZn_2O_4$ having a spinel structure was prepared by sintering the product at about 1200° C. for about 48 hours in air. Then, $SnZn_2O_4$ nanoparticles with a diameter of about 100 nm were prepared by grinding the $SnZn_2O_4$ with a paint shaker for about 1 hour.

Figure 2:
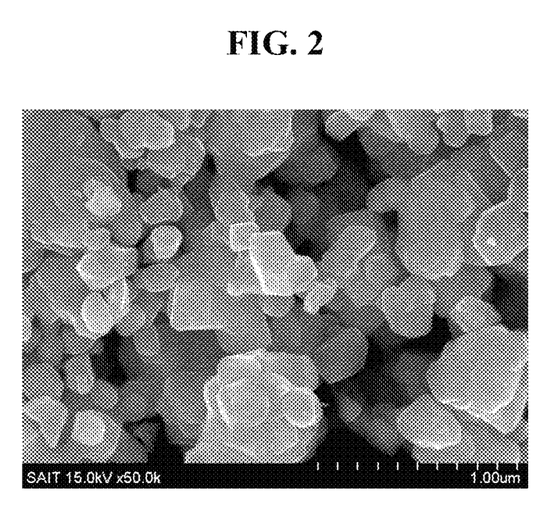
FIG. 2 illustrates a scanning electron microscope (SEM) image of a $SnZn_2O_4$ prepared in Preparation Example 1.

FIG. 2 shows a scanning electron microscope (SEM) image of $SnZn_2O_4$ nanoparticles prepared in Preparation Example 1.

Comparative Preparation Example 1
(Co-Precipitation Method)

Tin chloride ($SnCl_4$) and zinc nitrate ($Zn(NO_3)_2$) in a mole ratio of about 1:2 were added to water to prepare a first aqueous solution. LiOH was added to water to prepare a second aqueous solution. The first and second aqueous solutions were mixed to co-precipitate $SnZn_2(OH)_8$. The precipitated $SnZn_2(OH)_8$ was filtered, dried, and sintered at a temperature of about 850° C. in an oxygen atmosphere for about 12 hours to manufacture $SnZn_2O_4$. Next, $SnZn_2O_4$ nanoparticles with a diameter of about 100 nm were prepared by grinding the $SnZn_2O_4$ with a paint shaker for about 1 hour.

Manufacturing Surface-Treated 5 V Cathode Active Material

Example 1

SnO and ZnO were mixed at a mole ratio of about 1:2, and then milled at about 300 to about 500 rpm for about 5 hours in a planetary ball mill (Fritsch, Planetary mono mill 6). Subsequently, $SnZn_2O_4$ having a spinel structure was prepared by sintering the product at about 1200° C. for about 48 hours in air. Then, $SnZn_2O_4$ nanoparticles with a diameter of about 100 nm were prepared by grinding the $SnZn_2O_4$ with a paint shaker for about 1 hour.

Figure 3:
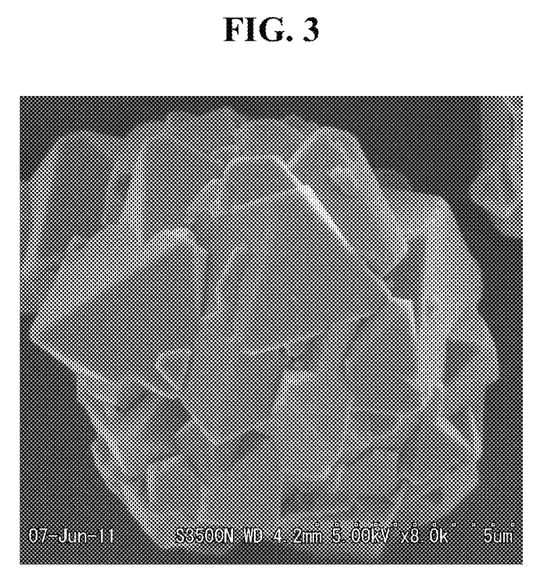
FIG. 3 illustrates an SEM image of $LiNi_{0.5}Mn_{1.5}O_4$ powder used in Example 1.
Figure 4:
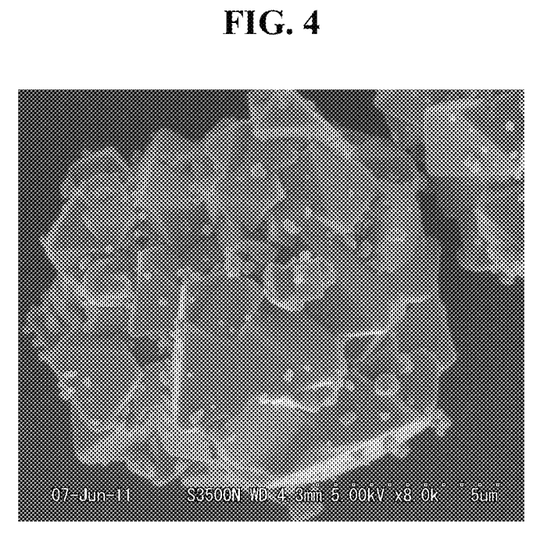
FIG. 4 illustrates an SEM image of a cathode active material manufactured in Example 1.

3 parts by weight of the $SnZn_2O_4$ nanoparticles and 97 parts by weight of $LiNi_{0.5}Mn_{1.5}O_4$ powder with an average particle diameter of 10 μm were mixed. The $LiNi_{0.5}Mn_{1.5}O_4$ powder with an average particle diameter of 10 μm is shown in FIG. 3. A cathode active material of which a surface treatment layer including $SnMg_2O_4$ was formed on a $LiNi_{0.5}Mn_{1.5}O_4$ core was prepared by putting the mixture into a dry type surface treatment device (Hosokawa Micron Corporation, Japan, Mechanofusion device, Nobilta-130)

and treating at about 6000 rpm for about 5 minutes. The prepared cathode active material is shown in FIG. 4.

Example 2

A cathode active material was manufactured using the same method as in Example 1 except for using SnO and magnesium oxide (MgO) as a lithium-free oxide precursor to form a surface treatment layer including $SnMg_2O_4$.

Example 3

A cathode active material was manufactured using the same method as in Example 1 except for using MgO and aluminum oxide ($Al_2O_3$) as a lithium-free oxide precursor and using a mole ratio of MgO and aluminum nitrate to form a surface treatment layer including $MgAl_2O_4$.

Example 4

A cathode active material was manufactured using the same method as in Example 1 except for using copper oxide (CuO) and $Al_2O_3$ as a lithium-free oxide precursor and using a mole ratio to form a surface treatment layer including $CuAl_2O_4$.

Example 5

A cathode active material was manufactured using the same method as in Example 1 except for using ZnO and $Al_2O_3$ as a lithium-free oxide precursor and using a mole ratio of ZnO and $Al_2O_3$ to form a surface treatment layer including $ZnAl_2O_4$.

Example 6

A cathode active material was manufactured using the same method as in Example 1 except for using nickel oxide (NiO) and $Al_2O_3$ as a lithium-free oxide precursor and using a mole ratio of nickel oxide and $Al_2O_3$ to form a surface treatment layer including $NiAl_2O_4$.

Examples 7~12

Cathode active materials having surface treatment layers were respectively manufactured using the same methods as in Examples 1 to 6 except that the content of the lithium oxide precursor was changed to about 1 wt % (a mixture of 1 part by weight of the lithium-free oxide and 99 parts by weight of the cathode active material).

Examples 13~18

Cathode active materials having surface treatment layers were respectively manufactured using the same methods as in Examples 1 to 6 except that the content of the lithium oxide precursor was changed to about 5 wt % (a mixture of 5 parts by weight of the lithium-free oxide and 95 parts by weight of the cathode active material).

Examples 19~24

Cathode active materials having surface treatment layers were respectively manufactured using the same methods as in Examples 1 to 6 except that the lithium oxide precursor content was changed to about 10 wt % (a mixture of 10 parts by weight of the lithium-free oxide and 90 parts by weight of the cathode active material).

Comparative Example 1

$LiNi_{0.5}Mn_{1.5}O_4$ having an average particle diameter of about 10 μm was directly used as a cathode active material without manufacturing a surface treatment layer.
Manufacturing Surface-Treated OLO Cathode Active Material Example 25

SnO and ZnO were mixed at a mole ratio of about 1:2, and then milled at about 300 to about 500 rpm for about 5 hours in a planetary ball mill (Fritsch, Planetary mono mill 6). Subsequently, $SnZn_2O_4$ having a spinel structure was prepared by sintering the product at about 1200° C. for about 48 hours in air. Then, $SnZn_2O_4$ nanoparticles with a diameter of about 100 nm were prepared by grinding the $SnZn_2O_4$ with a paint shaker for about 1 hour.

3 parts by weight of the $SnZn_2O_4$ nanoparticles and 97 parts by weight of $Li[Li_{0.05}Ni_{0.45}Co_{0.16}Mn_{0.35}]O_2$ powder with an average particle diameter of 10 μm were mixed. A cathode active material, of which a surface treatment layer including $SnMg_2O_4$ was formed on a $Li[Li_{0.05}N_{0.45}Co_{0.16}Mn_{0.35}]O_2$ core, was prepared by putting the mixture into a dry surface treatment device (Hosokawa Micron Corporation, Japan, Mechanofusion device, Nobilta-130) and treating at about 6000 rpm for about 5 minutes.

Example 26

A cathode active material was manufactured using the same method as in Example 25 except for using SnO and MgO as a lithium-free oxide precursor to form a surface treatment layer including $SnMg_2O_4$.

Example 27

A cathode active material was manufactured using the same method as in Example 25 except for using MgO and $Al_2O_3$ as a lithium-free oxide precursor and using a mole ratio of MgO and $Al_2O_3$ to form a surface treatment layer including $MgAl_2O_4$.

Example 28

A cathode active material was manufactured using the same method as in Example 25 except for using CuO and $Al_2O_3$ as a lithium-free oxide precursor and using a mole ratio of CuO and $Al_2O_3$ to form a surface treatment layer including $CuAl_2O_4$.

Example 29

A cathode active material was manufactured using the same method as in Example 25 except for using ZnO and $Al_2O_3$ as a lithium-free oxide precursor and using a mole ratio of ZnO and $Al_2O_3$ to form a surface treatment layer including $ZnAl_2O_4$.

Example 30

A cathode active material was manufactured using the same method as in Example 25 except for using NiO and $Al_2O_3$ as a lithium-free oxide precursor and using a mole ratio of NiO and $Al_2O_3$ to form a surface treatment layer including $NiAl_2O_4$.

Examples 31~36

Cathode active materials having surface treatment layers were respectively manufactured using the same methods as in Examples 25 to 30 except that the content of the lithium oxide precursor content was changed to about 1 wt % (a mixture of 1 part by weight of lithium-free oxide and 99 parts by weight of cathode active material).

Examples 37~42

Cathode active materials having surface treatment layers were respectively manufactured using the same methods as in Examples 25 to 30 except that the content of the lithium oxide precursor was changed to about 5 wt % (a mixture of 5 parts by weight of lithium-free oxide and 95 parts by weight of cathode active material).

Examples 43~48

Cathode active materials having surface treatment layers were respectively manufactured using the same methods as in Examples 25 to 30 except that the content of the lithium oxide precursor was changed to about 10 wt % (a mixture of 10 parts by weight of lithium-free oxide and 90 parts by weight of cathode active material).

Comparative Example 2

$Li[Li_{0.5}Ni_{0.45}Cu_{0.16}Mn_{0.35}]O_2$ having an average particle diameter of about 10 µm was directly used as a cathode active material without manufacturing a surface treatment layer.

Manufacturing Cathode

Example 49

A cathode active material manufactured according to Example 1, a carbon conducting agent (Ketchen Black, EC-600JD), and PVDF were mixed at a weight ratio of about 93:3:4, and then the mixture was mixed with NMP in an agate mortar to manufacture slurry. The slurry was applied on an aluminum current collector having a thickness of about 15 µm to a thickness of about 20 µm by using a doctor blade, was dried at room temperature, and then was dried again under vacuum conditions and at a temperature of about 120° C. and was rolled to form a cathode plate on which a cathode active material layer was formed.

Examples 50~96

Cathode plates were manufactured using the same method as in Example 49 except that cathode active materials of Examples 2 to 48 were respectively used.

Comparative Examples 3~4

Cathode plates were manufactured using the same method as in Example 49 except that cathode active materials of Comparative Examples 1 to 2 were used.

Manufacturing Lithium Battery

Example 97

A coin cell was manufactured using a cathode plate manufactured according to Example 49, lithium metal as a counter electrode, and a solution, in which a PTFE separator and 1.3M $LiPF_6$ were dissolved by ethylene carbonate (EC)+diethyl carbonate (DEC) (volume ratio of about 3:7), as an electrolyte.

Examples 98~144

Coin cells were manufactured using the same methods as in Example 97 except that cathode plates manufactured according to Examples 50 to 96 were respectively used.

Comparative Example 5~6

Coin cells were manufactured using the same methods as in Example 97 except that cathode plates manufactured according to Comparative Examples 3 to 4 were respectively used.

Evaluation of Example 1: XRD Analysis

Figure 1A:
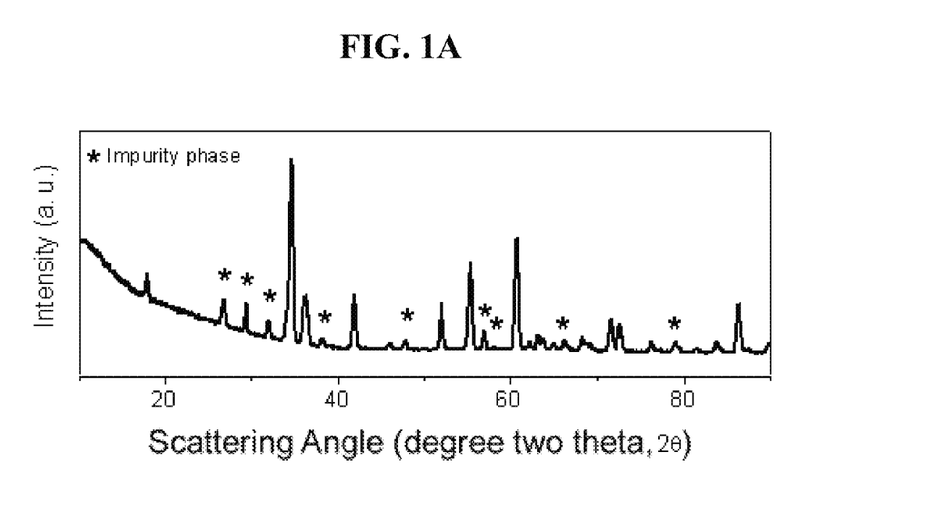
FIGS. 1A and 1B are graphs of intensity (arbitrary units, a.u.) versus scattering angle (degrees two-theta, 2θ) which illustrate a result of X-ray diffraction (XRD) analysis of $SnZn_2O_4$ manufactured according to Comparative Preparation Example 1, and Preparation Example 1, respectively.
Figure 1B:
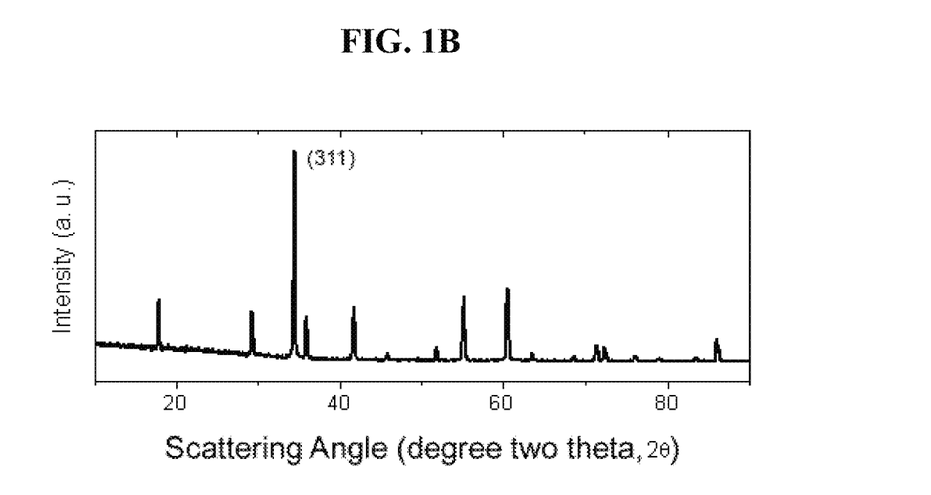

XRD analysis was performed on each surface of SnZn2O4 manufactured according to Preparation Example 1 and the Comparative Preparation Example 1, and a result thereof is illustrated in FIG. 1A and FIG. 1B. Cu—Kα radiation was used for the XRD measurement).

FIG. 1A illustrates a result of XRD analysis of $SnZn_2O_4$ manufactured according to Comparative Preparation Example 1.

FIG. 1B illustrates a result of XRD analysis of $SnZn_2O_4$ manufactured according to Preparation Example 1.

As illustrated in FIG. 1B, $SnZn_2O_4$ of Preparation Example 1 only had a characteristic peak corresponding to $SnZn_2O_4$ having a spinel structure; however, as illustrated in FIG. 1A, $SnZn_2O_4$ of Comparative Preparation Example 1 had many peaks corresponding to impurity phases. $SnZn_2O_4$ of Preparation Example 1 practically did not include impurity phases. That is, intensities of peaks corresponding to impurity phases in an XRD spectrum that is measured using Ca—Kα radiation were at a level of a noise level or lower.

Also, a diffraction peak at about 34° 2θ for a (311) crystal face in FIG. 1A was shown, and a full width at half maximum (FWHM) of the diffraction peak was about 0.530°. However, a FWHM of the diffraction peak for a (311) crystal face in FIG. 1B was about 0.260°. That is, the $SnZn_2O_4$ of Preparation Example 1 had significantly improved crystalline properties compared to $SnZn_2O_4$ of Comparative Preparation Example 1.

Evaluation of Example 2: Inductively-Coupled Plasma (ICP) Analysis

An ICP experiment was performed on a surface of a cathode active material manufactured according to Example 1.

A device used to perform the ICP experiment was the model ICPS-8100 of Shimadzu Corporation. A composition ratio of Sn:Zn on the cathode active material surface was about 1.000:2.000.

Evaluation of Example 3: High-Temperature Stability at about 60° C.

Constant-current charging was performed on coin cells manufactured according to Examples 97 to 120 and Comparative Example 5, to a voltage of 4.45 V at a rate of 0.05 C, and constant-current discharging was performed to a voltage of 3.0 V at a rate of 0.05 C in a first cycle. In a second cycle, constant-current charging was performed to a voltage of 4.45 V at a rate of 0.1 C, and then constant-voltage charging was performed until a current became 0.05 C while maintaining a voltage at 4.45, and constant-current discharging was performed to a voltage of 3.0 V at a rate of 0.1 C. In a third cycle, constant-current charging was performed to a voltage of 4.45 V at a rate of 0.5 C, and then constant-voltage charging was performed until a current became 0.05 C while maintaining a voltage at 4.45 V, and constant-current discharging was performed to a voltage of 3.0 V at a rate of 0.2 C. In the third cycle, discharge capacity was considered as standard capacity.

In a fourth cycle, a charging operation was performed to a voltage of 4.45 V at a rate of 0.5 C, and then constant-voltage charging was performed until a current became 0.05 C while maintaining a voltage at 4.45 V. Thereafter, the charged batteries were stored in an oven at a temperature of about 60° C. for about seven days, and then were removed to be discharged to a voltage of 3.0 V at a rate of 0.1 C. Some results of the charging and discharging operations are shown in Table 1 below. A capacity retention ratio after high temperature storage is defined as expressed in the following Equation 1.

Capacity retention ratio after high temperature storage[%]=discharge capacity after high temperature storage in a fourth cycle/standard capacity× 100%,      Equation 1 wherein the standard capacity is a discharge capacity in a third cycle.

Evaluation of Example 4: High-Temperature Stability about 90° C.

The stability experiment was performed on coin cells manufactured according to Examples 97 to 120 and Comparative Example 5 using the same method as in the Evaluation of Example 3 except that the charged batteries were stored in an oven at a temperature of about 90° C. for about 4 hours. Some results of the charging and discharging operations are shown in Table 1 below. A capacity retention ratio after high temperature storage is defined as expressed in Equation 1 above.

TABLE 1

|  | Capacity retention ratio after storage at 60° C. for 7 days [%] | Capacity retention ratio after storage at 90° C. for 4 hours [%] |
|---|---|---|
| Comparative Example 5 | 1.7 | 58.2 |
| Example 97 | 43.7 | 77.7 |
| Example 98 | 41.6 | 75.6 |

As shown in Table 1, capacity retention ratios after high temperature storage of the lithium batteries of Examples 97 to 98 were significantly improved in comparison with the lithium batteries of Comparative Example 5. That is, stability at high temperature of the lithium batteries of Examples 97 to 98 was significantly improved.

Evaluation of Example 7: High Temperature Charge/Discharge Experiment

Coin cells manufactured according to Examples 97 to 120 and Comparative Example 5 were charged/discharged 100 times with a constant current of about 1 C rate in the voltage range of 3.5 V to 4.9 V (vs. Li) at a high temperature of about 60° C. A capacity retention ratio in a $100^{th}$ cycle is calculated from the following Equation 2. An initial coulombic efficiency is defined as expressed in Equation 3. The capacity retention ratios and the initial coulombic efficiencies in a $100^{th}$ cycle are shown in Table 2.

Capacity retention ratio in $100^{th}$ cycle[%]=discharge capacity in $100^{th}$ cycle/discharge capacity in $1^{st}$ cycle×100%      Equation 2

Initial Coulombic Efficiency[%]=discharge capacity in $1^{st}$ cycle/charge capacity in $1^{st}$ cycle×100%      Equation 3

TABLE 2

|  | Retention ratio in $100^{th}$ cycle [%] | Initial coulombic efficiency [%] |
|---|---|---|
| Comparative Example 5 | 74.4 | 89.5 |
| Example 97 | 81.8 | 93.8 |
| Example 98 | 83.1 | 94.4 |

As shown in Table 2, the lithium batteries of Examples 97 to 98 showed improved high temperature life characteristics and initial coulombic efficiencies in comparison with the lithium battery of Comparative Example 5.

Evaluation of Example 6: High Rate Characteristics Analysis

Figure 5:
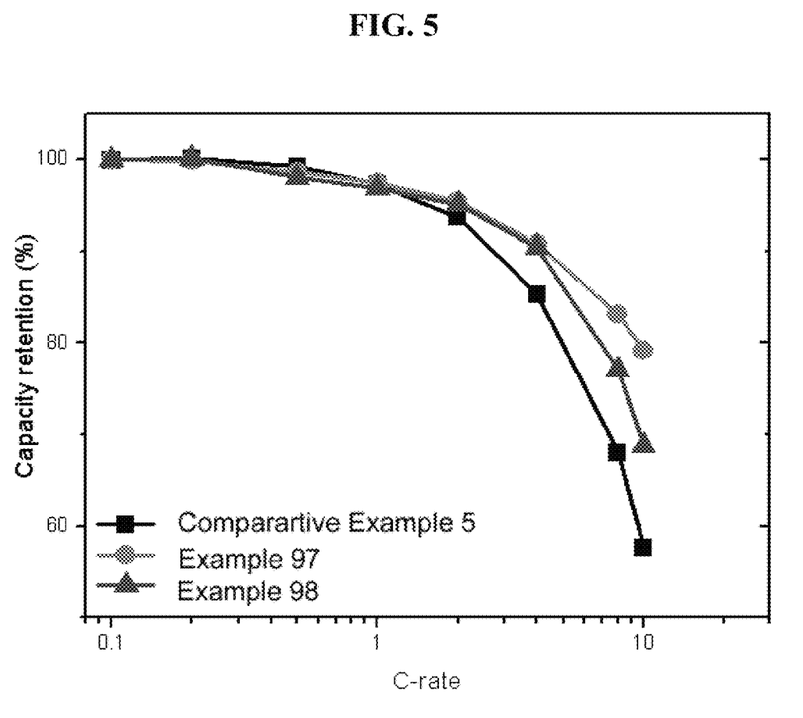
FIG. 5 is a graph of capacity retention (percent, %) versus C-rate which illustrates the discharge rate characteristics of lithium batteries manufactured according to Examples 97 to 98 and Comparative Example 5.

Coin cells manufactured according to Examples 97 to 98 and Comparative Example 5 were charged with a constant current of about 0.1 C rate in the voltage range of about 3.5 V to about 4.9 V (vs. Li) at room temperature and a capacity retention ratio according to increased current density is shown in FIG. 4. Current densities during discharge were about 0.1 C, 0.2 C, 0.5 C, 1 C, 2 C, 5 C, 8 C and 10 C rate respectively. In FIG. 5, a capacity retention is calculated from the following Equation 4.

Capacity retention ratio for each rate[%]=discharge capacity for each rate/discharge capacity at 0.1 C×100%      Equation 4

As shown in FIG. 5, high rate characteristics of the lithium batteries of Examples 97 to 98 were improved in comparison with the lithium batteries of Comparative Example 5.

As described above, according to the one or more of the above Examples, since a core capable of intercalating and deintercalating lithium is surface-treated with a spinel-structured lithium-free oxide excluding impurity phases, high temperature stability, high temperature life characteristics, and high rate characteristics of a lithium battery may be improved.

It should be understood that the exemplary embodiments described therein should be considered in a descriptive sense only and not for purposes of limitation. Descriptions of features or aspects within each embodiment should be considered as available for other similar features or aspects in other embodiments.

What is claimed is:
1. An electrode active material, consisting of:
a core capable of intercalating and deintercalating lithium; and
a surface treatment layer that completely covers the core, wherein the surface treatment layer comprises a lithium-free oxide having a spinel structure, and an intensity of an X-ray diffraction peak corresponding to impurity phases of the lithium-free oxide, when measured using

Cu—Kα radiation, is at a noise level of an X-ray diffraction spectrum or less, wherein, the lithium-free oxide is one or more selected from $SnMg_2O_4$, $SnZ_2O_4$, $MgAl_2O_4$, $CuAl_2O_4$, $ZnAl_2O_4$ and $NiAl_2O_4$, and wherein the core comprises one or more compounds selected from compounds expressed by the following Formulas 4 to 8:

$$Li_xCo_{1-y}M_yO_{(2-\alpha)}X_\alpha, \quad \text{Formula 4}$$

$$Li_xCo_{(1-y-z)}Ni_yM_zO_{(2-\alpha)}X_\alpha, \quad \text{Formula 5}$$

$$Li_xMn_{(2-y)}M_yO_{(4-\alpha)}X_\alpha, \quad \text{Formula 6}$$

$$Li_xCo_{(2-y)}M_yO_{(4-\alpha)}X_\alpha, \text{ and} \quad \text{Formula 7}$$

$$Li_xMe_yM_zPO_{(4-\alpha)}X_\alpha \quad \text{Formula 8}$$

wherein $0.90 \leq x \leq 1.1$, $0 \leq y \leq 0.9$, $0 \leq z \leq 0.5$, $(1-y-z)>0$, $0 \leq \alpha \leq 2$;

Me is one or more metals selected from Ti, V, Cr, Mn, Fe, Co, Ni, Cu, Al, Mg, Zr, and B;

M is one or more elements selected from Mg, Ca, Sr, Ba, Ti, Zr, Nb, Mo, W, Zn, Al, Si, Ni, Mn, Cr, Fe, Mg, Sr, V, and a rare-earth element; and X is an element selected from O, F, S, and P.

2. The electrode active material of claim 1, wherein the lithium-free oxide has an X-ray diffraction peak at about 35.5°±2.0° two-theta for a peak corresponding to a (311) crystal face, when measured using Cu—Kα radiation, and a full width at half maximum of the X-ray diffraction peak corresponding to the (311) crystal face is less than 0.3° two-theta.

3. The electrode active material of claim 1, wherein the lithium-free oxide has an X-ray diffraction peak at about 35.5°±2.0° two-theta for a peak corresponding to a (311) crystal face, when measured using Cu—Kα radiation, and a full width at half maximum of the X-ray diffraction peak corresponding to the (311) crystal face is about 0.220° two-theta to about 0.270° two-theta.

4. The electrode active material of claim 1, wherein a ratio of an intensity of an X-ray diffraction peak corresponding to a (440) crystal face to an intensity of an X-ray diffraction peak corresponding to a (311) crystal face is about 0.3 or more.

5. The electrode active material of claim 1, wherein a ratio of an intensity of an X-ray diffraction peak corresponding to a (511) crystal face to an intensity of an X-ray diffraction peak corresponding to a (400) crystal face is about 0.25 or more.

6. The electrode active material of claim 5, wherein a ratio of an intensity of an X-ray diffraction peak corresponding to a (511) crystal face to an intensity of an X-ray diffraction peak corresponding to a (440) crystal face is about 0.5 or more.

7. The electrode active material of claim 5, wherein a content of the lithium-free oxide is about 10 weight percent or less, based on a total weight of the electrode active material.

8. The electrode active material of claim 5, wherein a thickness of the surface treatment layer is about 1 angstrom to about 1 micrometer.

9. An electrode comprising an electrode active material according to claim 5.

10. A lithium battery comprising an electrode according to claim 9.

* * * * *